US012662119B2

(12) United States Patent
Kato et al.

(10) Patent No.: US 12,662,119 B2
(45) Date of Patent: Jun. 23, 2026

(54) DRIVING SUPPORT DEVICE

(71) Applicant: HONDA MOTOR CO., LTD., Tokyo (JP)

(72) Inventors: Daichi Kato, Tokyo (JP); Satoshi Sadamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 18 days.

(21) Appl. No.: 18/776,285

(22) Filed: Jul. 18, 2024

(65) Prior Publication Data

US 2025/0033638 A1    Jan. 30, 2025

(30) Foreign Application Priority Data

Jul. 25, 2023    (JP) ................................. 2023-120966

(51) Int. Cl.
| | |
|---|---|
| *B60W 30/14* | (2006.01) |
| *B60W 30/12* | (2020.01) |
| *B60W 30/16* | (2020.01) |
| *B60W 50/10* | (2012.01) |
| *B60W 50/14* | (2020.01) |

(52) U.S. Cl.
CPC .......... *B60W 30/146* (2013.01); *B60W 30/12* (2013.01); *B60W 30/162* (2013.01); *B60W 50/10* (2013.01); *B60W 50/14* (2013.01); *B60W 2050/146* (2013.01)

(58) Field of Classification Search
None
See application file for complete search history.

(56) References Cited

U.S. PATENT DOCUMENTS

| | | | | |
|---|---|---|---|---|
| 10,322,721 | B2 * | 6/2019 | Coburn | .............. B60W 30/143 |
| 11,203,350 | B2 * | 12/2021 | Ochida | .............. B60W 50/023 |
| 11,392,270 | B2 * | 7/2022 | Takahashi | .............. B60K 35/28 |
| 11,524,694 | B2 * | 12/2022 | Ibuka | .............. B60W 30/18163 |
| 11,584,375 | B2 * | 2/2023 | Kato | .................... G05D 1/0223 |
| 11,708,082 | B2 * | 7/2023 | Nishida | ................ B60K 35/215 |
| | | | | 701/1 |
| 11,760,366 | B2 * | 9/2023 | Aoyagi | .......... B60W 60/00186 |
| | | | | 701/29.7 |
| 11,919,547 | B1 * | 3/2024 | Komori | .............. B60W 30/182 |
| 12,162,348 | B2 * | 12/2024 | Hamaguchi | ............ B60K 26/02 |
| 2018/0141548 | A1 * | 5/2018 | Coburn | ................. B60K 35/80 |

(Continued)

FOREIGN PATENT DOCUMENTS

| | | | | |
|---|---|---|---|---|
| CN | 109017814 A | * | 12/2018 | .......... G01C 21/165 |
| CN | 109017814 B | * | 1/2020 | .......... G01S 13/931 |

(Continued)

OTHER PUBLICATIONS

Japanese Office Action for Japanese Patent Application No. 2023-120966 mailed May 27, 2025.

*Primary Examiner* — Kevin R Steckbauer
(74) *Attorney, Agent, or Firm* — Amin, Turocy & Watson, LLP

(57) ABSTRACT

A driving support device mounted on a vehicle includes a plurality of first control units, and a plurality of second control units of which a support level is lower than that of the plurality of first control units, and the plurality of the first control units start when a first switch is operated, and the plurality of second control units start when a second switch different from the first switch is operated.

8 Claims, 5 Drawing Sheets

(56)        References Cited

U.S. PATENT DOCUMENTS

| | | | | |
|---|---|---|---|---|
| 2019/0359221 | A1* | 11/2019 | Ochida | B60W 10/18 |
| 2020/0239015 | A1* | 7/2020 | Nishida | B60W 30/08 |
| 2020/0307595 | A1* | 10/2020 | Kato | B60W 10/30 |
| 2021/0229683 | A1* | 7/2021 | Aoyagi | B60W 60/0018 |
| 2021/0229685 | A1* | 7/2021 | Ibuka | B60W 60/0053 |
| 2023/0150509 | A1* | 5/2023 | Kato | B60W 30/18163 |
| | | | | 701/26 |
| 2024/0051583 | A1* | 2/2024 | Komori | B60W 10/184 |
| 2024/0131925 | A1* | 4/2024 | Hamaguchi | B60K 35/10 |
| 2024/0227553 | A9* | 7/2024 | Hamaguchi | B60K 35/10 |
| 2025/0033638 | A1* | 1/2025 | Kato | B60W 50/082 |

FOREIGN PATENT DOCUMENTS

| | | | | | |
|---|---|---|---|---|---|
| CN | 111032472 | A | * | 4/2020 | B60W 50/14 |
| CN | 110920741 | B | * | 8/2022 | B60W 50/14 |
| CN | 111032472 | B | * | 6/2023 | B60W 60/00186 |
| CN | 116670004 | A | * | 8/2023 | B60W 60/005 |
| CN | 116670004 | B | * | 5/2024 | B60W 60/0051 |
| CN | 118238808 | A | * | 6/2024 | B60W 10/20 |
| CN | 119370093 | A | * | 1/2025 | B60W 30/162 |
| DE | 102011101541 | A1 | * | 11/2012 | B60K 35/10 |
| DE | 102021129193 | A1 | * | 5/2023 | B60W 50/0205 |
| DE | 102011101541 | B4 | * | 7/2024 | B60K 35/10 |
| JP | 2007-196854 | | | 8/2007 | |
| JP | 2007196854 | A | * | 8/2007 | |
| JP | 2017-047821 | | | 3/2017 | |
| JP | 2017-149229 | | | 8/2017 | |
| JP | 2020163907 | A | * | 10/2020 | B60W 30/18163 |
| JP | 2022167410 | A | * | 11/2022 | |
| JP | 2024-060202 | | | 5/2024 | |
| JP | 2024060202 | A | * | 5/2024 | B60W 50/08 |

* cited by examiner

FIG. 4

(STATE 2)

| 70A | 70B | 70C |

(STATE 5-1)

| 70A | AAA 70B | 70C |

(STATE 5-2)

| 70A | BBB AAA 70B | 70C |

(STATE 3 OR 6)

70A      70B      70C

DRIVING SUPPORT DEVICE

CROSS-REFERENCE TO RELATED APPLICATION

Priority is claimed on Japanese Patent Application No. 2023-120966, filed Jul. 25, 2023, the content of which is incorporated herein by reference.

BACKGROUND

Field of the Invention

The present invention relates to a driving support device.

Description of Related Art

In recent years, efforts to provide access to a sustainable transportation system taking vulnerable people among transportation participants into account have become more active. To realize this, research and development for further improving traffic safety or convenience through research and development regarding driving support has been concentrated upon. In connection therewith, Japanese Unexamined Patent Application, First Publication No. 2017-047821 and Japanese Unexamined Patent Application, First Publication No. 2017-149229 describe a configuration provided with a cruise control switch and a variable speed limit control switch.

Deceleration control for maintaining an inter-vehicle distance from a preceding vehicle, steering control with a looser degree of control than lane keeping control, and the like are considered for control of driving support, in addition to follow-up travel control or the lane keeping control. Thus, the number of types of controls of driving support tend to gradually increase, but when dedicated switches are provided for the respective controls, there is concern that a driver may not be able to get used to operations. In the related art, efficient functional unification for reducing the number of switches has not been considered.

SUMMARY OF THE INVENTION

The present invention has been made in consideration of such circumstances, and an object of the present invention is to provide a driving support device capable of realizing efficient functional unification for reducing the number of switches. This in turn contributes to the development of a sustainable transportation system.

The driving support device according to the present invention adopts the following configurations.

(1) A driving support device according to the present invention is a driving support device mounted on a vehicle, the driving support device including: a plurality of first control units configured to perform driving support control; and a plurality of second control units configured to perform the driving support control, a support level of the plurality of second control units being lower than that of the plurality of first control units, wherein the plurality of the first control units start when a first switch is operated, and the plurality of second control units start when a second switch different from the first switch is operated.

(2) In the aspect (1), the plurality of first control units include both a control unit configured to perform driving support control in a longitudinal direction and a control unit configured to perform driving support control in a lateral direction, and the plurality of second control units include both a control unit configured to perform driving support control in a longitudinal direction and a control unit configured to perform driving support control in a lateral direction.

(3) A driving support device according to another aspect of the present invention is a driving support device mounted on a vehicle, the driving support device including: a plurality of first control units including both a control unit configured to perform driving support control in a longitudinal direction and a control unit configured to perform driving support control in a lateral direction; and a plurality of second control units including both a control unit configured to perform driving support control in a longitudinal direction and a control unit configured to perform driving support control in a lateral direction, wherein the plurality of first control units start when a first switch is operated, and the plurality of second control units start when a second switch different from the first switch is operated.

(4) In any one of the aspects (1) to (3), when an ignition switch of the vehicle is brought into an OFF state in a state where the plurality of first control units start, and then, the ignition switch of the vehicle is brought into an ON state, the plurality of first control units do not automatically start, and when the ignition switch of the vehicle is brought into the OFF state in a state where the plurality of second control units start, and then, the ignition switch of the vehicle is brought into the ON state, the plurality of second control units automatically start.

(5) In any one of the aspects (1) to (3), when the plurality of first control units start when the first switch is operated in the state where the plurality of second control units start, and then, the plurality of first control units stop and the plurality of second control units start when the first switch is operated.

(6) In any one of the aspects (1) to (3), one of the plurality of first control units performs follow-up travel control, the other of the plurality of first control units performs lane keeping control, one of the plurality of second control units performs deceleration control for maintaining an inter-vehicle distance from a preceding vehicle, and the other of the plurality of second control units performs steering control with a lower degree of control than the lane keeping control.

(7) In any one of the aspects (1) to (3), the plurality of the second control units include a speed limit control unit configured to start when a third switch capable of setting a speed is operated in a state where the other second control unit starts.

(8): In the aspect (7), an image prompting the driver to consent is displayed on a display unit when the third switch is operated, and the speed limit control unit starts when a consent operation is performed by the driver.

(9): In any one of the aspects (1) to (3), the plurality of second control units include a speed limit control unit which starts when a legal speed of a road where there is the vehicle is recognized in a state where the other second control units start.

(10) In the aspect (9), an image prompting the driver to accept is displayed on a display unit when the legal speed of the road where there is the vehicle is recognized in a state where the plurality of second control units start, and the speed limit control unit starts when a consent operation is performed by the driver.

According to the aspects (1) to (10), it is possible to realize efficient functional unification for reducing the number of switches.

BRIEF DESCRIPTION OF THE DRAWINGS

FIG. 4 illustrates an example of a display screen of a display device.

DETAILED DESCRIPTION OF THE INVENTION

[Configuration]

Figure 1:
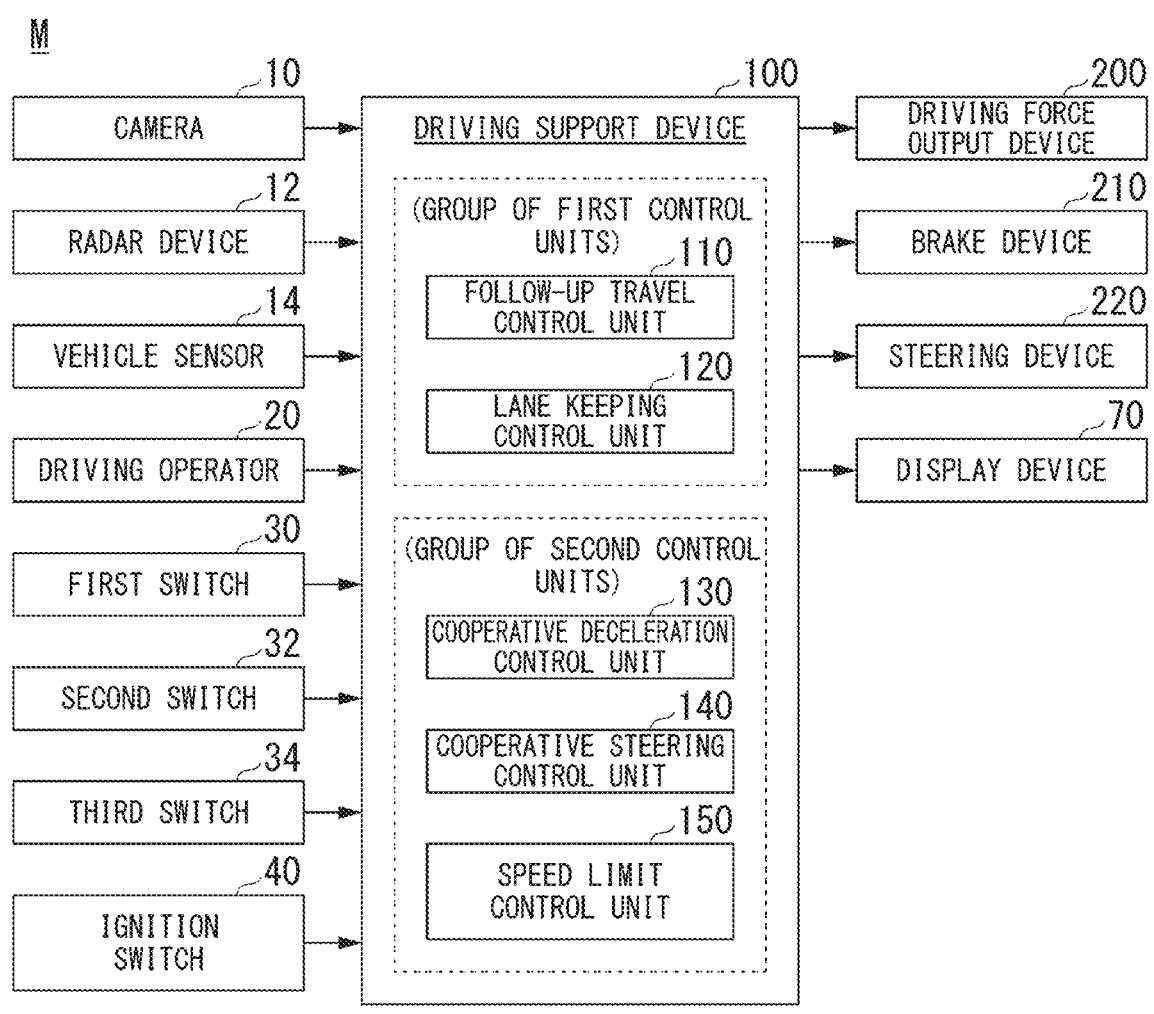
FIG. 1 illustrates a part of a configuration of a vehicle M on which a driving support device is mounted.

Hereafter, an embodiment of a driving support device of the present invention will be described with reference to the drawings. FIG. 1 illustrates a part of a configuration of a vehicle M on which a driving support device 100 is mounted. An external sensor such as a camera 10 and a radar device 12, a vehicle sensor 14 such as a vehicle speed sensor or a yaw rate sensor, a driving operator 20 such as an accelerator pedal, a brake pedal, or a steering wheel, a first switch 30, a second switch 32, and a third switch 34 for transferring an instruction to the driving support device 100, an ignition switch 40 for starting a driving force output device 200, a display device 70, and the like are mounted on the vehicle M. Further, a device for movement of the driving force output device 200, a brake device 210, and a steering device 220 are mounted on the vehicle M.

The camera 10 is, for example, a digital camera using a solid-state imaging element such as a charge coupled device (CCD) or a complete metal oxide semiconductor (CMOS). The camera 10 is attached to an optional location on the vehicle M. When the camera 10 images a region in front of the vehicle M, the camera 10 is attached to an upper part of a front windshield, a rear surface of a room mirror, or the like. For example, the camera 10 periodically and repeatedly images surroundings of the vehicle M. The camera 10 may be a stereo camera.

The radar device 12 radiates radio waves such as millimeter waves around the vehicle M, and detects radio waves (reflected waves) reflected by an object to detect at least a position (a distance and direction) of the object. The radar device 12 is attached to any arbitrary position on the vehicle M. The radar device 12 may detect a position and speed of the object using a frequency modulated continuous wave (FM-CW) scheme. The roles of the various switches will be described later. The display device 70 is provided, for example, in a portion in front of a driver in an instrument panel.

The driving force output device 200 outputs a traveling driving force (torque) for traveling of the vehicle to a driving wheel. The driving force output device 200 includes, for example, a combination of an internal combustion engine, an electric motor, a transmission, and the like, and an electronic control unit (ECU) for controlling these.

The brake device 210 includes, for example, a brake caliper, a cylinder that transfers hydraulic pressure to the brake caliper, an electric motor that generates hydraulic pressure to the cylinder, and a brake ECU. The brake ECU controls the electric motor so that a brake torque is output to each wheel. The brake device 210 may include, as a backup, a mechanism for transferring hydraulic pressure generated by an operation of the brake pedal included in the driving operator 20 to the cylinder via a master cylinder. The brake device 210 is not limited to the above-described configuration and may be an electronically controlled hydraulic brake device.

The steering device 220 includes, for example, a steering ECU and an electric motor. For example, the electric motor changes a direction of the steering wheel by applying a force to a rack-and-pinion mechanism. The steering device 220 may further include a reaction force motor for outputting a reaction force to the steering wheel. The steering ECU changes the direction of a steering wheel by driving the electric motor.

The driving support device 100 includes, for example, a follow-up travel control unit 110, a lane keeping control unit 120, a cooperative deceleration control unit 130, a cooperative steering control unit 140, and a speed limit control unit 150. Each of the follow-up travel control unit 110 and the lane keeping control unit 120 is an example of a "first control unit" that performs driving support control, and each of the cooperative deceleration control unit 130, the cooperative steering control unit 140 and the speed limit control unit 150 is an example of a "second control unit" that performs the driving support control. These control units are realized, for example, by a hardware processor such as a central processing unit (CPU) executing a program (software). Some or all of these components may be realized by hardware (a circuit unit; including circuitry) such as a large scale integration (LSI), application specific integrated circuit (ASIC), field-programmable gate array (FPGA), or graphics processing unit (GPU), and may be realized by cooperation between software and hardware. The program may be stored in a storage device (a storage device including a non-transient storage medium) such as a hard disk drive (HDD) or a flash memory, or may be stored in a removable storage medium such as a DVD or a CD-ROM and installed by the storage medium being mounted in a drive device.

The follow-up travel control unit 110 controls the driving force output device 200 and/or the brake device 210 to adjust the speed of the vehicle M (for both acceleration and deceleration) so that an inter-vehicle distance between the preceding vehicle traveling just in front of the vehicle M and the vehicle M is maintained at a set inter-vehicle distance in a lane where the vehicle M is present. A position of the preceding vehicle is recognized through analysis of an image captured by the camera 10 or on the basis of an output value of the radar device 12. The follow-up travel control unit 110 controls the driving force output device 200 and/or the brake device 210 so that the vehicle M travels while maintaining a set speed when the preceding vehicle is not recognized within a valid distance.

The lane keeping control unit 120 controls the steering device 220 so that a steering reaction force is output so that the vehicle M moves along a center part of a lane where there is the vehicle M or a steering force in a direction of returning the vehicle M to the center part of the lane at a timing when the vehicle M is about to deviate from the lane is output.

The cooperative deceleration control unit 130 controls the driving force output device 200 and/or the brake device 210 to exclusively decelerate the vehicle M so that the inter-vehicle distance between the preceding vehicle and the vehicle M is maintained at the set inter-vehicle distance. For example, when the preceding vehicle accelerates and leaves after deceleration and the driver of the vehicle M wants to travel at a position close to the preceding vehicle, the driver operates the accelerator pedal by him or herself to accelerate the vehicle M.

The cooperative steering control unit 140 performs more loose steering control than the lane keeping control unit 120 in order to curb deviation of the vehicle M from the lane. "Loose" includes some or all of a control gain being smaller, an operation threshold being larger (being on a side in which an operation is difficult), an upper limit of control being smaller, and the like. For example, the cooperative steering control unit 140 operates only in the case of an obstacle (including the preceding vehicle) in a direction in which the vehicle M travels.

The speed limit control unit 150 controls the driving force output device 200 and/or the brake device 210 so that the vehicle M is decelerated when the speed of the vehicle M exceeds an upper limit speed (or the speed of the vehicle M is likely to exceed the upper limit speed).

The first switch 30 is intended to simultaneously or sequentially start the follow-up travel control unit 110 and the lane keeping control unit 120. The second switch 32 simultaneously or sequentially starts the cooperative deceleration control unit 130 and the cooperative steering control unit 140 and starts the speed limit control unit 150 conditionally. Both a set speed of the follow-up travel control unit 110 and the upper limit speed of the speed limit control unit 150 can be adjusted by the third switch 34.

[State Transition]

Figure 2:
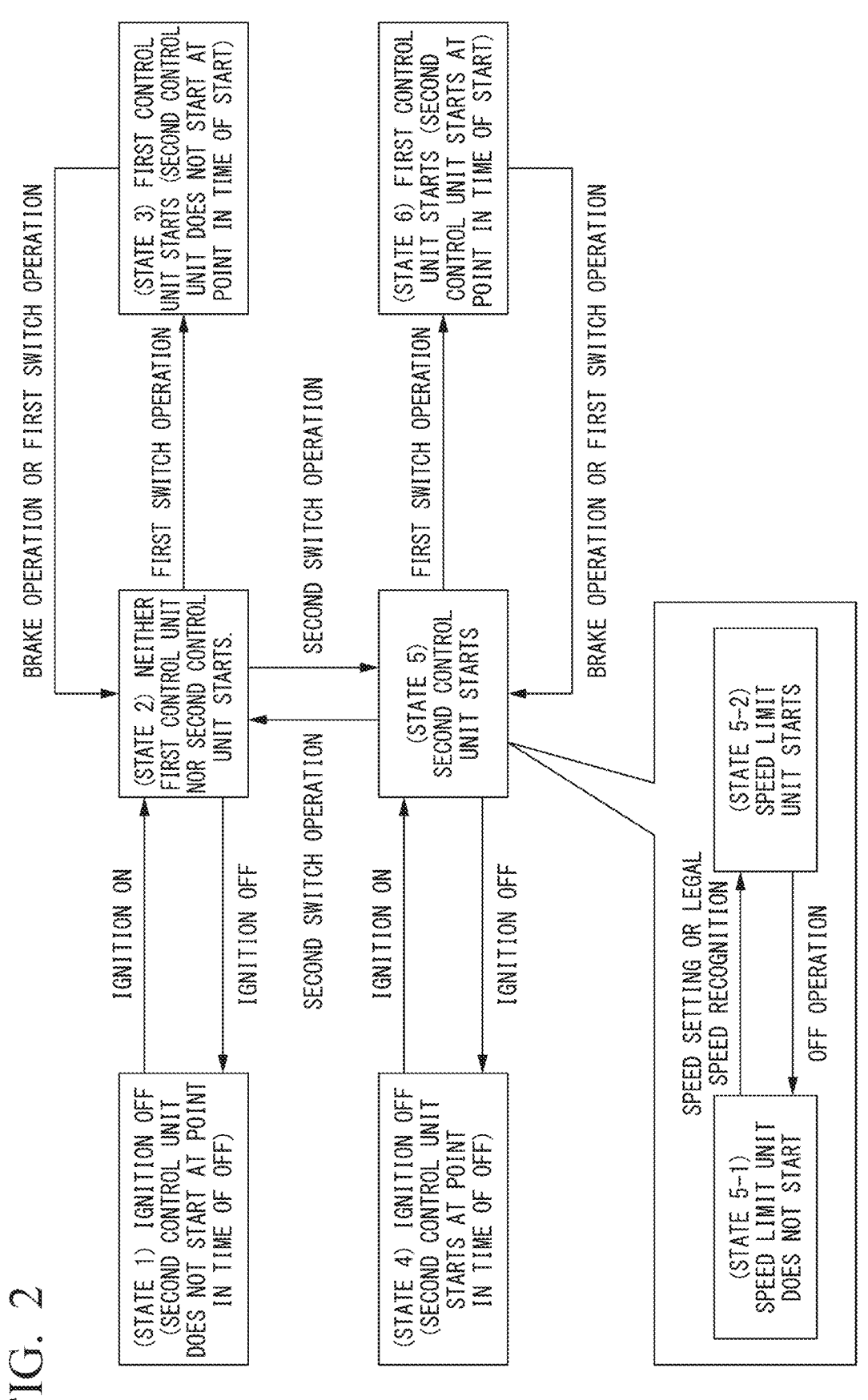
FIG. 2 is a state transition diagram of the driving support device.

FIG. 2 illustrates a state transition diagram of the driving support device 100. As illustrated, the driving support device 100 can be in each of state 1 to state 6. State 5 includes state 5-1 and state 5-2.

State 1 is a state where an ignition is OFF and the second control unit does not start at a point in time of ignition OFF. Whether or not the second control unit starts at the point in time of ignition OFF is stored in a nonvolatile memory or the like, and each unit of the driving support device 100 reads stored information and operates. When an ignition ON operation is performed in state 1, transition to state 2 occurs.

State 2 is a state where neither the first control unit nor the second control unit starts. When the ignition OFF operation is performed in state 2, transition to state 1 occurs. When the first switch 30 is operated in state 2, transition to state 3 occurs. Further, when the second switch 32 is operated in state 2, transition to state 5 occurs.

State 3 is a state where the first control unit starts and the second control unit does not start at a point in time when the first control unit starts. When a predetermined amount or more of brake operation is performed with respect to the brake pedal in state 3, or when the first switch 30 is operated again, transition to state 2 occurs. When the second switch 32 is operated in state 3, transition to state 5 occurs.

State 4 is a state where the ignition is OFF and the second control unit starts at a point in time of the ignition OFF. When the ignition ON operation is performed in state 4, transition to state 5 occurs.

State 5 is a state where the second control unit starts (here, the speed limit control unit 150 may or may not start). State 5-1 is a state where the speed limit control unit 150 does not start. When transition from state 2, 4, or 6 to state 5 occurs, transition to state 5-1 is first performed. In state 5-1, when the upper limit speed is set by an operation of the third switch 34 or a legal speed is recognized, for example, through analysis of the image captured by the camera 10, and an approval operation is performed by the driver (described later), transition to state 5-2 occurs. The legal speed may be recognized through collating with map information using a position of the vehicle M positioned by a global positioning system (GPS) receiver or the like in addition to being recognized by image analysis, or may be recognized by another communication means. State 5-2 is a state where the speed limit control unit 150 starts.

When the first switch 30 is operated in state 5, transition to state 6 occurs. In state 6, the first control unit starts and the second control unit has started at a point in time when the first control unit starts. When a predetermined amount or more of brake operation is performed with respect to the brake pedal in state 6, or when the first switch is operated again, transition to state 5 occurs. When the second switch 32 is operated in state 6, transition to state 5 may be performed.

The start of each control unit may be performed spontaneously by each control unit including a daemon program built thereinto, or an upper control unit supervising the control units may start each control unit according to a switch operation. In the former case, operation content of each switch is transmitted in a broadcast manner to each control unit by a multiple communication network such as a controller area network (CAN).

[Functions]

Thus, the driving support device 100 includes a plurality of first control units, and a plurality of second control units having a lower support level than the plurality of first control units, the plurality of first control units start when the first switch 30 is operated, and the plurality of second control units start when the second switch 32 different from the first switch 30 is operated. Accordingly, since each of the plurality of first control units and the plurality of second control units of which support levels are similar are divided by separate switches and started simultaneously, it is possible to start a plurality of controls constituting a driving level according to the intention of the driver through one switch operation. As a result, it is possible to realize efficient functional unification for reducing the number of switches.

"A plurality of second control units having a lower support level than the plurality of first control units" means that a degree of control is low when control units that perform control in a longitudinal direction (speed control) are compared and control units that perform control in a lateral direction (steering control) are compared. For example, since the cooperative deceleration control unit 130 and the speed limit control unit 150 are control units that exclusively perform deceleration, the cooperative deceleration control unit 130 and the speed limit control unit 150 have a lower degree of control than the follow-up travel control unit 110 that performs both acceleration and deceleration. Further, the cooperative steering control unit 140 performs more loose steering control than the lane keeping control unit 120, and can be said to have a lower degree of control than the lane keeping control unit 120.

Further, the plurality of first control units include both the control unit that performs control in a longitudinal direction (speed control) and the control unit that performs control in a lateral direction (steering control), and the plurality of second control units similarly include both the control unit that performs control in a longitudinal direction (speed control) and the control unit that performs control in a lateral direction (steering control). This makes it possible to start a plurality of control units that execute controls which do not compete with each other substantially simultaneously, and thus, to perform switching to control with high validity.

Further, when the ignition switch 40 of the vehicle M is brought into an OFF state and then the ignition switch 40 of the vehicle M is brought into an ON state in a state where the plurality of first control units start, the plurality of first control units do not automatically start (state 1→2 or state 4→5), and when the ignition switch 40 of the vehicle M is brought into the OFF state and then the ignition switch 40 of the vehicle M is brought into the ON state in a state where the plurality of second control units starts (state 5→4→5), the plurality of second control units automatically start. This makes it unnecessary for the driver to operate the second control unit again, and to reduce troublesomeness. Since the first control unit has a high support level, an unexpected situation may occur when the vehicle M automatically starts from the time of start, and therefore, the ignition switch 40 is brought into the ON state so that the vehicle M does not automatically start. As a result, it is possible to realize smooth start of the vehicle M.

Further, when the first switch 30 is operated in the state where the plurality of second control units start, the plurality of first control units start, and then, when the first switch 30 is operated (state 5→6→5), the plurality of first control units stop and the plurality of second control units start. This makes it possible to switch between the state where the plurality of first control units start and the state where the plurality of second control units start only through the operation of the first switch 30 in the state where the plurality of second control units start, and thus, it is possible to simplify the operation of the occupant.

Further, one of the plurality of first control units is the follow-up travel control unit 110 that performs follow-up travel control, the other of the plurality of first control units is the lane keeping control unit 120 that performs lane keeping control, one of the plurality of second control units is the cooperative deceleration control unit 130 that performs deceleration control for maintaining the inter-vehicle distance from the preceding vehicle, and the other of the plurality of second control units is the cooperative deceleration control unit 130 that performs steering control with a lower degree of control than the lane keeping control unit 120. Accordingly, the plurality of first control units having a high support level off-start without taking over a previous start state and have a lower support level than the follow-up travel control unit 110 or the lane keeping control unit 120, and the plurality of second control units that cooperate with the occupant operation to provide support leading to the safety of the occupant take over the previous start state, making it possible to prevent a dangerous state at a timing earlier than collision avoidance and deviation curbing. As a result, it is possible to actively set the support leading to the safety of the occupant to an ON state while curbing excessive support.

[Aspect of Switch and Display Screen]

Figure 3:
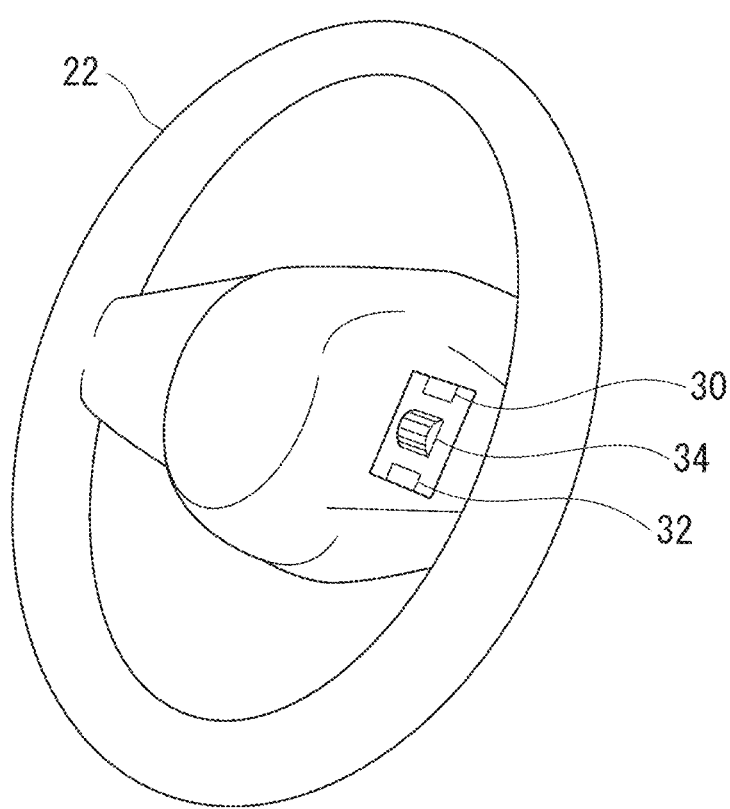
FIG. 3 is a diagram illustrating a configuration example of a first switch, a second switch, and a third switch.

FIG. 3 illustrates a configuration example of the first switch 30, the second switch 32, and the third switch 34. The first switch 30, the second switch 32, and the third switch 34, for example, are disposed together on either right or left sides of a boss part of a steering wheel 22, and can be operated with one hand by the driver. Each of the first switch 30 and the second switch 32 is, for example, a switch capable of a push operation or a tap operation, and the switch itself is not provided with a state holding function. Each of the first switch 30 and the second switch 32 may be a mechanical switch or may be a touch panel switch. The third switch 34 is provided between the first switch 30 and the second switch 32 so that the driver can recognize an approximate position by touch without viewing these. For example, with the third switch 34, it is possible to instruct both an increase and a decrease in a set value substantially continuously by rotating a cylindrical wheel part up and down. The driver can operate the third switch 34 to adjust the set speed in the follow-up travel control unit 110 and the upper limit speed in the speed limit control unit 150, for example, up and down in increments of 5 [km/h]. Further, since the follow-up travel control unit 110 and the speed limit control unit 150 do not simultaneously start, adjustments of values do not compete.

FIG. 4 illustrates an example of a display screen of the display device 70. The display screen of the display device 70 is divided into regions 70A, 70B and 70C, for example. In a state where the plurality of first control units do not start (state 2 or 5), the speed of the vehicle M is displayed in the form of a speed meter in the region 70A. In state 5-1, a character or an object (indicated by "AAA" in FIG. 4) indicating that the cooperative deceleration control unit 130 and the cooperative steering control unit 140 start is displayed in the region 70B. In state 5-2, a character or an object (indicated by "BBB" in FIG. 4) indicating that the speed limit control unit 150 starts is further displayed in the region 70B.

In state 5-1, when the upper limit speed is set by the operation of the third switch 34 or a legal speed is recognized through analysis of the image captured by the camera 10, an image prompting consent of the start of the speed limit control unit 150 is displayed in the region 70C. The speed limit control unit 150 starts when a consent operation is performed by the driver. This consent operation is performed with respect to the second switch 32, for example.

Figure 5:
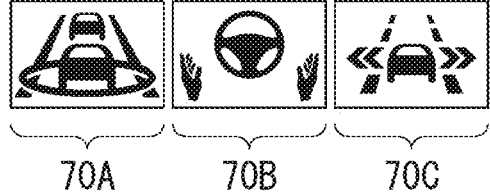
FIG. 5 illustrates another example of the display screen of the display device.

FIG. 5 illustrates another example of the display screen of the display device 70. FIG. 5 illustrates the display screen when the plurality of first control units start. In such a case, an object indicating a detailed operation state of each of the first control units is displayed in each region. The display device 70 is controlled by a display control unit (not illustrated) of the driving support device 100 so that a state of any one of the plurality of first control units and the plurality of second control units is displayed. This makes it possible to present necessary information to the driver without increasing the display screen.

The plurality of second control units include the speed limit control unit 150 which starts after the consent operation of the driver when the third switch 34 capable of setting a speed is operated or a legal speed of a road where there is the vehicle M is recognized in a state where the other second control unit starts. Accordingly, the speed limit control unit 150 is prevented from starting in a state where a speed setting is unknown, and further, since the second switch 32 accepts the consent operation, an increase in the number of switches is curbed.

According to the embodiment described above, it is possible to realize efficient functional unification for reducing the number of switches.

Implementation Aspects

The plurality of first control units and the plurality of second control units described above can be referred to as a plurality of first control devices and a plurality of second control devices when the plurality of first control units and the plurality of second control units are realized by a dedicated processor. Further, the plurality of first control units and the plurality of second control units can be replaced with a plurality of first programs and a plurality of second programs regardless of whether the plurality of first control units and the plurality of second control units are realized by the dedicated processor.

The embodiment described above can be expressed as follows.

A plurality of first control devices each including a storage medium that stores computer-readable instructions, and a processor connected to the storage medium, and a plurality of second control devices each including a storage medium that stores computer-readable instructions, and a processor connected to the storage medium are included, the plurality of the second controllers perform control at a lower support level than that of the plurality of the first control devices, the plurality of the first control devices start when the first switch is operated, and the plurality of second control devices start when a second switch different from the first switch is operated.

For example, the plurality of first control devices include a follow-up travel control device and a lane keeping control device, and the plurality of second control devices include a cooperative deceleration control device, a cooperative steering control device, and a speed limit control device.

The embodiment described above can also be expressed as follows.

A storage medium that stores computer-readable instructions, and a processor connected to the storage medium are included, in which a plurality of first programs each including a plurality of instructions and a plurality of second programs each including a plurality of instructions are stored in the storage medium, driving support control is executed by each of the plurality of first programs being executed, and driving support control at a lower support level than that when the plurality of first programs are executed is executed by the plurality of second programs being executed, the plurality of first programs start when a first switch is operated, and the plurality of second programs start when a second switch different from the first switch is operated.

For example, the plurality of first programs include a follow-up travel control program and a lane keeping control program, and the plurality of second programs include a cooperative deceleration control program, a cooperative steering control program, and a speed limit control program.

Although the mode for implementing the present invention has been described above using the embodiments, the present invention is not limited to these embodiments in any way, and various modifications and substitutions can be made without departing from the gist of the present invention.

What is claimed is:

1. A driving support device mounted on a vehicle, the driving support device comprising a hardware processor configured to execute a program to implement:

a plurality of first controllers configured to perform driving support control; and a plurality of second controllers configured to perform the driving support control, a degree of control of the plurality of second controllers being lower than that of the plurality of first controllers, wherein the hardware processor is further configured:

to start the plurality of the first controllers when a first switch is operated, to start the plurality of second controllers when a second switch different from the first switch is operated, not to automatically start the plurality of first controllers when an ignition switch of the vehicle is brought into an off state in a state where the plurality of first controllers have started, and then, the ignition switch of the vehicle is brought into an on state, and to automatically start the plurality of second controllers when the ignition switch of the vehicle is brought into the OFF state in a state where:

the plurality of second controllers have started, and the ignition switch of the vehicle is brought into the on state.

2. The driving support device according to claim 1, wherein the plurality of first controllers comprise both a controller configured to perform driving support control in a longitudinal direction and a controller configured to perform driving support control in a lateral direction, and the plurality of second controllers comprise both a controller configured to perform driving support control in a longitudinal direction and a controller configured to perform driving support control in a lateral direction.

3. The driving support device according to claim 1, wherein:

a first controller of the plurality of first controllers performs follow-up travel control, another controller of the plurality of first controllers different from the first controller, performs lane keeping control, a second controller of the plurality of second controllers performs deceleration control for maintaining an inter-vehicle distance from a preceding vehicle, and another controller of the plurality of second controllers performs steering control with a lower degree of control than the lane keeping control.

4. The driving support device according to claim 1, wherein the plurality of second controllers comprise a speed limit controller configured to start when a third switch capable of setting a speed is operated in a state where a controller of the plurality of second controllers is started.

5. The driving support device according to claim 4, wherein;

an image prompting a driver of the vehicle to consent to the start of the speed limit controller is displayed on a display when the third switch is operated, and the speed limit controller is configured to start when a consent operation is performed by the driver.

6. The driving support device according to claim 1, wherein the plurality of second controllers comprise a speed limit controller which is configured to start when a legal speed of a road on which the vehicle is present is recognized in a state where a controller of the plurality of second controllers is started.

7. The driving support device according to claim 6, wherein:

when the speed limit controller starts, an image prompting a driver of the vehicle to accept the start of the speed limit controller is displayed on a display when the legal speed is recognized, and the speed limit controller starts when a consent operation is performed by the driver.

8. A driving support device mounted on a vehicle, the driving support device comprising a hardware processor configured to execute a program to implement:

a plurality of first controllers configured to perform driving support control; and a plurality of second controllers configured to perform the driving support control, a degree of control of the plurality of second controllers being lower than that of the plurality of first controllers, wherein the hardware processor is further configured:

to start the plurality of the first controllers when a first switch is operated, to start the plurality of second controllers when a second switch different from the first switch is operated, to start the plurality of first controllers when the first switch is operated in the state where the plurality of second controllers have been started, and to stop the plurality of first controllers and start the plurality of second controllers when the first switch is operated in the state where the plurality of first controllers have been stated.

\* \* \* \* \*